United States Patent
Hasegawa et al.

(10) Patent No.: US 11,334,269 B2
(45) Date of Patent: May 17, 2022

(54) CONTENT DRIVEN STORAGE AND RETRIEVAL OF FILES

(71) Applicant: International Business Machines Corporation, Armonk, NY (US)

(72) Inventors: Tohru Hasegawa, Tokyo (JP); Hiroaki Kikuchi, Yokohama (JP); Takuya Goto, Tokyo (JP); Asako Ono, Tokyo (JP); Xiangning Liu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/063,751

(22) Filed: Oct. 6, 2020

(65) Prior Publication Data
US 2022/0107742 A1 Apr. 7, 2022

(51) Int. Cl.
*G06F 3/06* (2006.01)

(52) U.S. Cl.
CPC .......... *G06F 3/0644* (2013.01); *G06F 3/0605* (2013.01); *G06F 3/0649* (2013.01); *G06F 3/0685* (2013.01); *G06F 3/0686* (2013.01)

(58) Field of Classification Search
CPC .... G06F 3/0605; G06F 3/0613; G06F 3/0643; G06F 3/0644; G06F 3/0649; G06F 3/065; G06F 3/067; G06F 3/0685; G06F 3/0686
USPC ................. 711/111, 148, 165, 170
See application file for complete search history.

(56) References Cited

U.S. PATENT DOCUMENTS

| | | | | |
|---|---|---|---|---|
| 6,571,310 | B1* | 5/2003 | Ottesen | G06F 3/0601 360/48 |
| 6,952,757 | B2* | 10/2005 | Carlson | G06F 3/0605 707/999.2 |
| 8,856,437 | B2 | 10/2014 | Sims | |
| 8,909,881 | B2 | 12/2014 | Bunte | |
| 9,830,085 | B1 | 11/2017 | Hasegawa | |
| 10,073,631 | B2 | 9/2018 | Hasegawa | |
| 10,073,632 | B2 | 9/2018 | Hasegawa | |
| 2004/0044854 | A1* | 3/2004 | Gibble | G06F 3/0608 711/154 |
| 2005/0086430 | A1* | 4/2005 | Allen | G06F 3/0685 711/114 |
| 2010/0306176 | A1 | 12/2010 | Johnson | |
| 2013/0326159 | A1* | 12/2013 | Vijayan | G06F 3/0605 711/148 |
| 2016/0019224 | A1 | 1/2016 | Ahn | |
| 2021/0026897 | A1* | 1/2021 | Rathje | G06F 16/3344 |

OTHER PUBLICATIONS

Haustein, Nils, "IBM Spectrum Archive Introduction to IBM Spectrum Archive™ and Use Cases", Version 10, EMEA Storage Competence Center, © 2016 IBM Corporation, 70 pages.
(Continued)

*Primary Examiner* — Gary J Portka
(74) *Attorney, Agent, or Firm* — David B. Woycechowsky

(57) ABSTRACT

Storage pools having categorized archival storage tapes according to content of files stored on each tape. Archiving new files into the storage pools according to content of the new files for efficient retrieval of files from storage tapes organized by category of content. Recall of multiple files from archival storage tapes to primary storage of an hierarchical storage management system is efficiently performed such that tape mounting operations are minimized.

9 Claims, 6 Drawing Sheets

(56) References Cited

OTHER PUBLICATIONS

IBM, "Replica and redundant copy creation at migration", Apr. 2, 2020, 5 pages, <https://www.ibm.com/support/knowledgecenter/ST9MBR_1.2.4/ltfs_ee_migrate_replicas.html>.
Oracle, "StorageTek Storage Archive Managerand StorageTek QFS Software Maintenance and Administration Guide", Release 5.4, E42064-02, Jan. 2015, Copyright © 2011, 2015, Oracle and/or its affiliates, 200 pages.

* cited by examiner

US 11,334,269 B2

CONTENT DRIVEN STORAGE AND RETRIEVAL OF FILES

BACKGROUND

The present invention relates generally to the field of data storage, and more particularly to archival and retrieval processes.

Magnetic tape data storage is a system for storing digital information on magnetic tape using digital recording. Modern magnetic tape is often found in the form of cartridges or cassettes, such as the widely supported Linear Tape-Open (LTO). The device that performs the writing or reading of data is called a tape drive. Autoloaders and tape libraries are often used to automate cartridge handling. Magnetic tape may be used for data storage, system backup, data archive, and data exchange.

As the amount of digital data has increased, operations of archiving old data have been started. For example, various data such as data relevant to product maintenance (for example, maintenance manuals) and/or information of products owned by product manufacturers, inquiries from clients about the products, and support information for them, is now being archived in anticipation of potential reuse. Primary storage devices include HDD (hard disk drive) devices while secondary storage is often made up of inexpensive tapes used for archiving purposes. When archiving files to tapes, the same files are sometimes saved to two or more tapes to have redundancy. In some cases, two tapes, primary and secondary of the same image, are created. Also, in some cases, files are saved in such a manner that one file is duplicated to two tapes.

In particular, in cases of hierarchical storage management (hereinafter referred to as HSM) systems, the latter method is occasionally adopted for the reason that users do not explicitly select tapes. Commercially available systems are available to perform these functions. Tapes inserted into a tape library are usually divided into several pools including various storage tapes. A file is archived by being written to multiple storage tapes included in different storage pools.

When reading files in an HSM system, also referred to herein as "recalling files," it is conceivable to read a certain number of files at once are read from tape storage to the primary HDD storage. In such a case, commercially available systems have functions which determine the order of reading files using a file list and reads out files successively.

SUMMARY

According to an aspect of the present invention, there is a method, computer program product and/or system that performs the following operations (not necessarily in the following order): (i) assigning content categories to individual files in a set of files stored on a plurality of storage tapes based on content of the file; (ii) recording each content category and the corresponding individual files assigned each content category, the recorded content categories being a set of all categories; (iii) grouping the plurality of storage tapes into storage pools, each storage pool representing a pre-defined set of content categories within the set of all categories; (iv) analyzing contents of a first file with respect to the set of all categories; (v) assigning a first category to the first file based on the contents of the first file; (vi) selecting a set of storage pools representing the assigned first category; and (vii) storing a copy of the first file in at least one storage tape in each storage pool of the selected storage pools.

DETAILED DESCRIPTION

Figure 1:
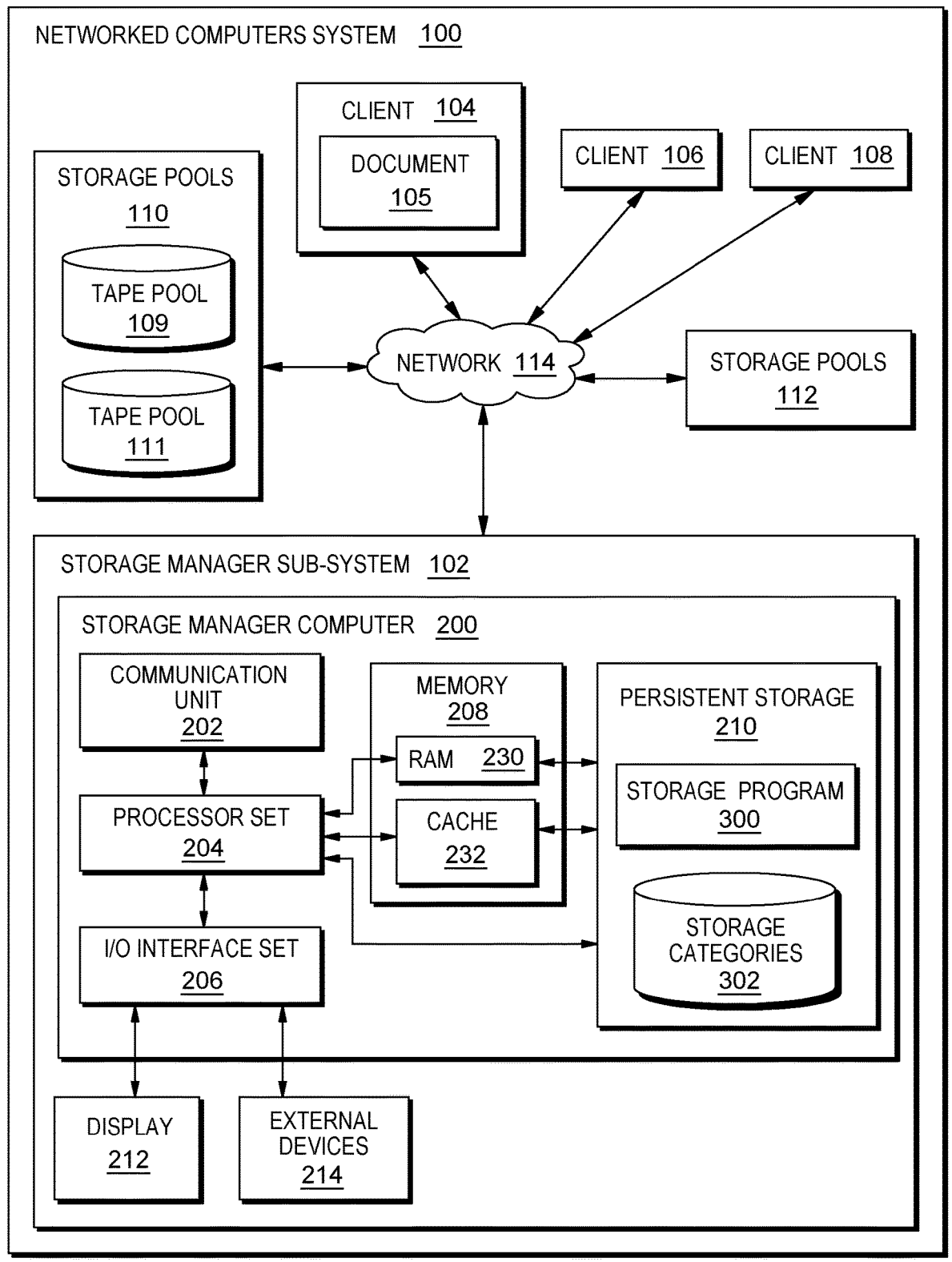
FIG. 1 is a block diagram view of a first embodiment of a system according to the present invention.

Some embodiments of the present invention are directed to storage pools having categorized archival storage tapes according to content of files stored on each tape. Archiving new files into the storage pools according to content of the new files for efficient retrieval of files from storage tapes organized by category of content. Recall of multiple files from archival storage tapes to primary storage of an hierarchical storage management system is efficiently performed such that tape mounting operations are minimized.

This Detailed Description section is divided into the following subsections: (i) The Hardware and Software Environment; (ii) Example Embodiment, Comments, and/or Alternative Embodiments; and (iii) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: storage manager sub-system 102; client sub-systems 104, 106, 108; document 105; storage pools sub-systems 110, 112; tape storage pools 109, 111; communication network 114; storage manager computer 200; communication unit 202; processor set 204; input/output (I/O) interface set 206; memory device 208; persistent storage device 210; display device 212; external device set 214; random access memory (RAM) device 230; cache memory device 232; storage program 300; and storage categories store 302.

Subsystem 102 may be a laptop computer, tablet computer, netbook computer, personal computer (PC), a desktop computer, a personal digital assistant (PDA), a smart phone, or any other type of computer (see definition of "computer"

in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with storage manager computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment, Further Comments, and/or Alternative Embodiments

Figure 2:
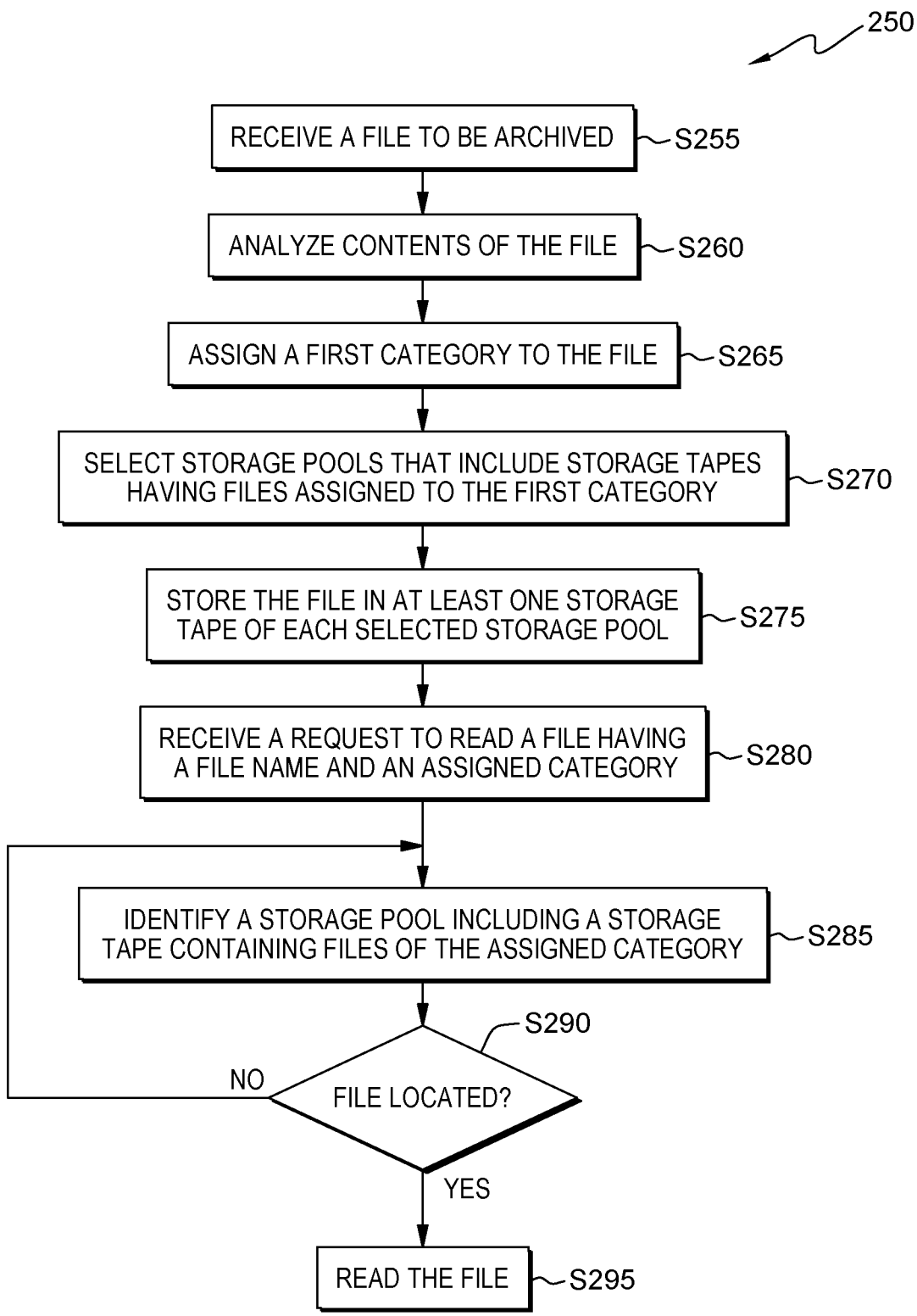
FIG. 2 is a flowchart showing a method performed, at least in part, by the first embodiment system.
Figure 3:
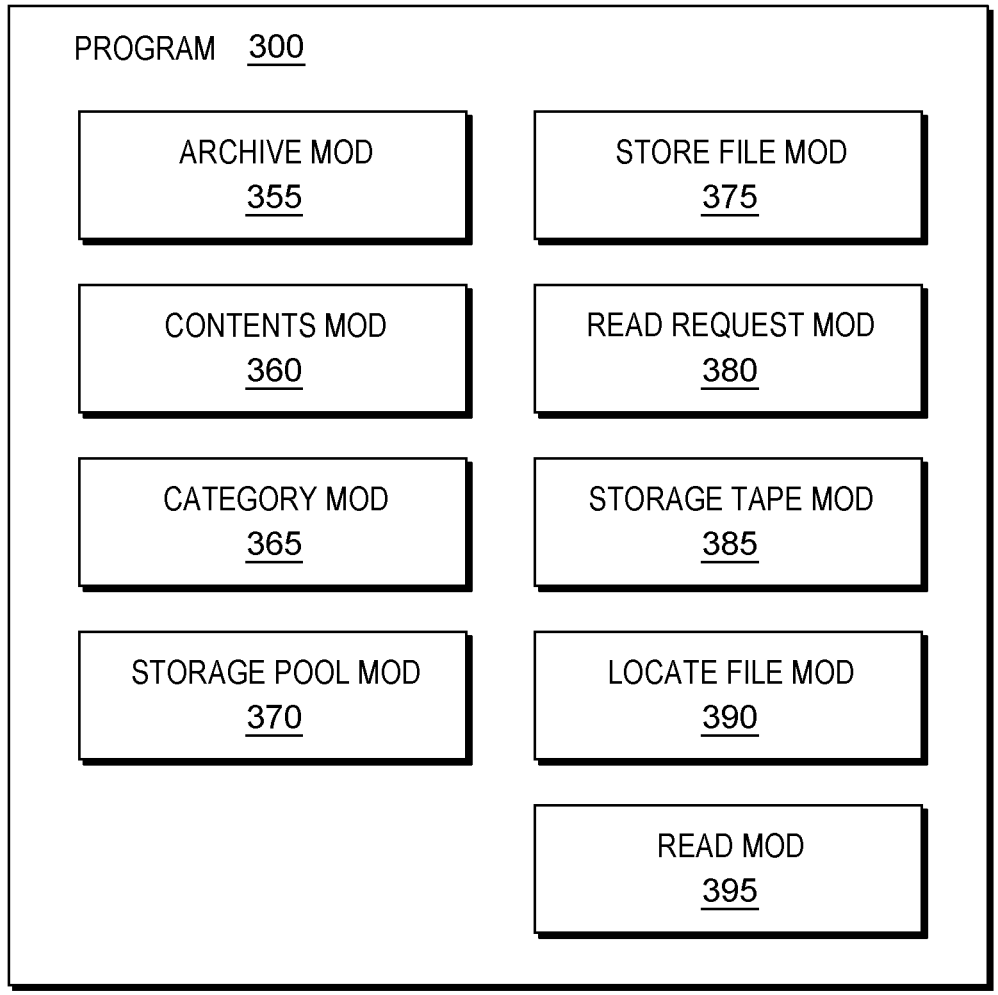
FIG. 3 is a block diagram view of a machine logic (for example, software) portion of the first embodiment system.

As shown in FIG. 1, networked computers system 100 is an environment in which an example method according to the present invention can be performed. As shown in FIG. 2, flowchart 250 shows an example method according to an embodiment of the present invention. FIG. 3 shows a diagram of operation blocks for performing the example method according to an embodiment of the present invention. This method and associated software will now be discussed, over the course of the following paragraphs, with extensive reference to the blocks of FIG. 1 (system of an embodiment of a hardware and software environment), FIG. 2 (operational flowchart), and FIG. 3 (diagram of operation blocks).

Processing begins at step S255, where archive module ("mod") 355 receives a file to be archived. In this example the file is received for archiving according to a user request to archive. Alternatively, the file is received in accordance with an archival policy that automatically directs receipt of the file for archiving. In this example, the file is document 105, stored in client sub-system 104 (FIG. 1). Alternatively, the file is an audio file.

Processing proceeds to step S260, where contents mod 360 analyzes the content of the file. For document files or other text files, the content is readily available for analysis. In the case of an audio file, a transcript is generated for determining text content of the file. Further, video or image files are processed to assign descriptive text to the file for determining content of the file.

Processing proceeds to step S265, where category mod 365 assigns a first category to the file. In this example categories are pre-determined according to current files stored on tapes in locations such as storage pools sub-system 110 including tape storage pools 109, 111 (FIG. 1). Cross reference from tapes, pools, and categories is available in storage categories store 302. Alternatively, a category of content is determined according to content of the file. If the determined category is not yet represented in the storage pools, a new category is generated for archival of the file. Details of the new category, location, and file are recorded, for example, to the storage categories store.

Processing proceeds to step S270, where storage pool mod 370 selects storage pools that include storage tapes having files assigned to the first category. Storage pools may store files of different categories. For example, tape storage pool 109 (FIG. 1) may store files assigned to categories such as quality control, customer support, and product specifications. Tape storage pool 111 may also store files assigned to the category of customer support, in addition to the category of preventive maintenance. Oftentimes a file is stored in more than one storage pool for redundancy. In this example, the first category is stored by both tape storage pool 109 and tape storage pool 111. Some embodiments of the present invention select only two storage pools even though the storage pool mod has access to several storage pools that include storage tapes having files assigned to the first category. Some embodiments of the present invention select the number of storage pools required by policy or otherwise required for archiving files.

Processing proceeds to step S275, where storage pool mod 375 stores the file in at least one storage tape of each selected storage pool. As discussed in more detail below, establishing a set of storage pools for content-based archival may lead to a pre-defined set of categories by which new files may be stored. Some embodiments of the present invention establish a specified number of pools including a same category to ensure that sufficient redundancy is available across storage pools. Alternatively, a single pool may contain multiple tapes having the same categories of files stored on them. As such, some embodiments of the present invention support redundant storage by content category within a single storage pool.

Processing proceeds to step S280, where read request mod 380 receives a request to read multiple files from storage tapes. A request to read multiple migrated files from tape are likely to be assigned a common category that will provide a quick reference to a particular set of tapes and/or storage pools and reduce the number of tapes that potentially include the archived files that are sought for reading. As will be described below, only tapes including certain assigned categories of files, will make up the selection pool during the search. In one example, the requester provides the assigned category. Alternatively, each requested file name is cross-referenced with a database to identify the assigned categories. Storage categories store 302 of FIG. 1 may be referenced to identify the assigned category for a given file name.

Processing proceeds to step S285, where storage tape mod 385 identifies a storage pool including storage tapes containing the requested files of each assigned category. While the requested files may not be in the identified storage pool, or in some cases, on the first storage tape mounted on the tape drive, the number of potential storage tapes to be mounted on tape drives is less than the total number of storage tapes available for mounting. The number of potential storage tapes mounted on tape drives is effectively reduced with reference to the assigned category of content in the requested files.

Processing proceeds to determination step S290, where read file mod 390 determines whether or not the requested files are found on the identified storage tape and/or storage pool of step S285 and reads each located file. If each of the requested files are located on the selected storage tape, processing proceeds down the "Yes" branch to step S295 where processing ends. For each requested file located on the storage tape in the tape drive, the file is read to the HDD storage. If some of the requested files are is not located on the selected storage tape and/or selected storage pool, processing proceeds down the "No" branch back to step S285 where storage tape mod 385 repeats the step of identifying a storage pool including a storage tape containing files of the assigned category and mounting a selected tape from the storage pool to a tape drive. The repeated step identifies a storage tape different than those previously mounted during the same search process.

As the term is used herein, reading a file is intended to be the same as recalling files. That is, a request to recall a file at step S280 would cause the same process to occur at step S290, where read mod 395 would recall the file to the extent that there is any difference between recalling the requested file and reading the requested file.

When each of the requested files are read at step S290, processing ends by following the "Yes" branch to step S295, where the process ends.

Figure 4:
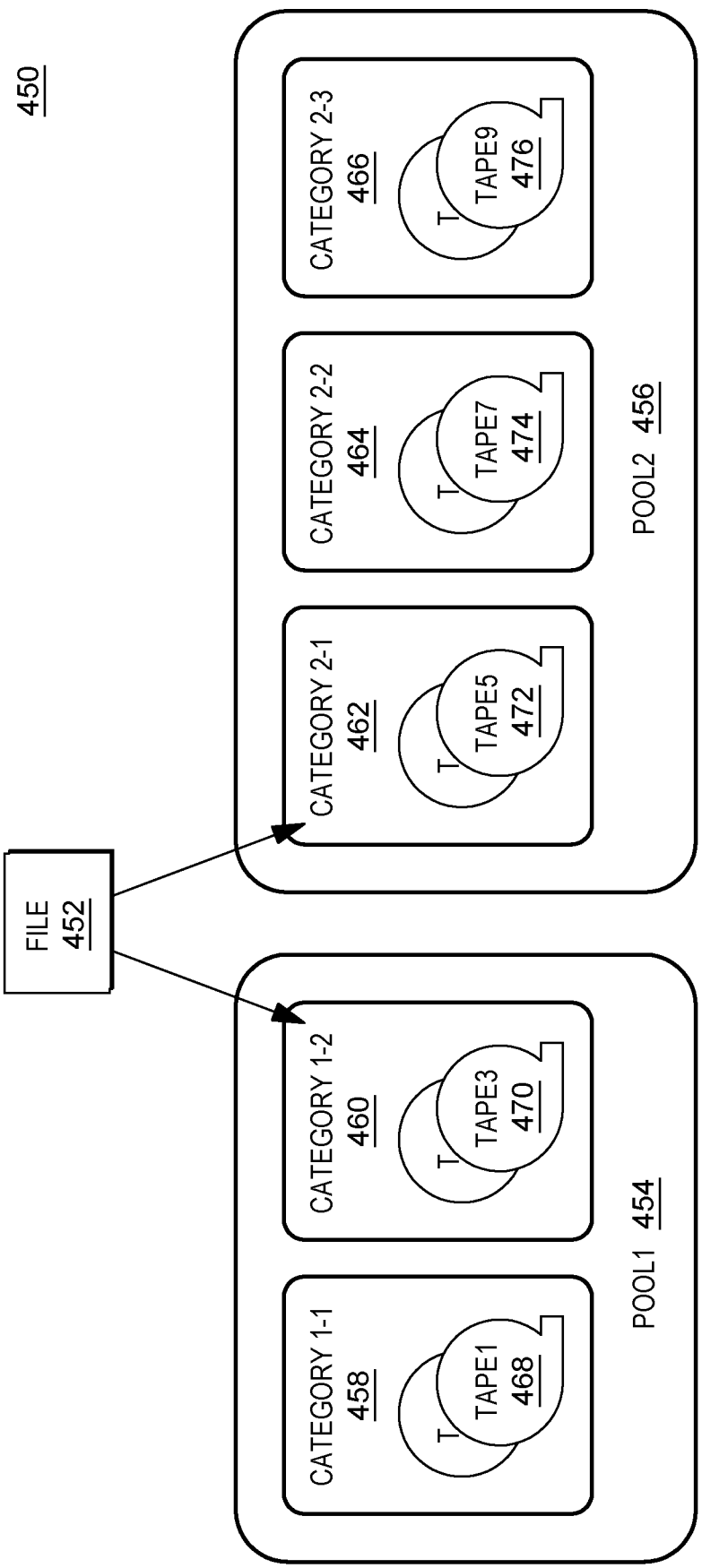
FIG. 4 is a block diagram view of a second embodiment of a system according to the present invention.

FIG. 4 illustrates redundant storage system 450 for classification of storage tapes in storage pools according to various categories of content on the tapes. Storage system 450 includes: new file 452; storage pool 1 (Ref 454); pool 1, category 1-1 sub-set 458; pool 1, category 1-2 sub-set 460; storage pool 2 (Ref 456); pool 2, category 2-1 sub-set 462; pool 2, category 2-2 sub-set 464; pool 2, category 2-3 sub-set 466; categorized tapes 468, 470, 472, 474, and 476.

Figure 5:
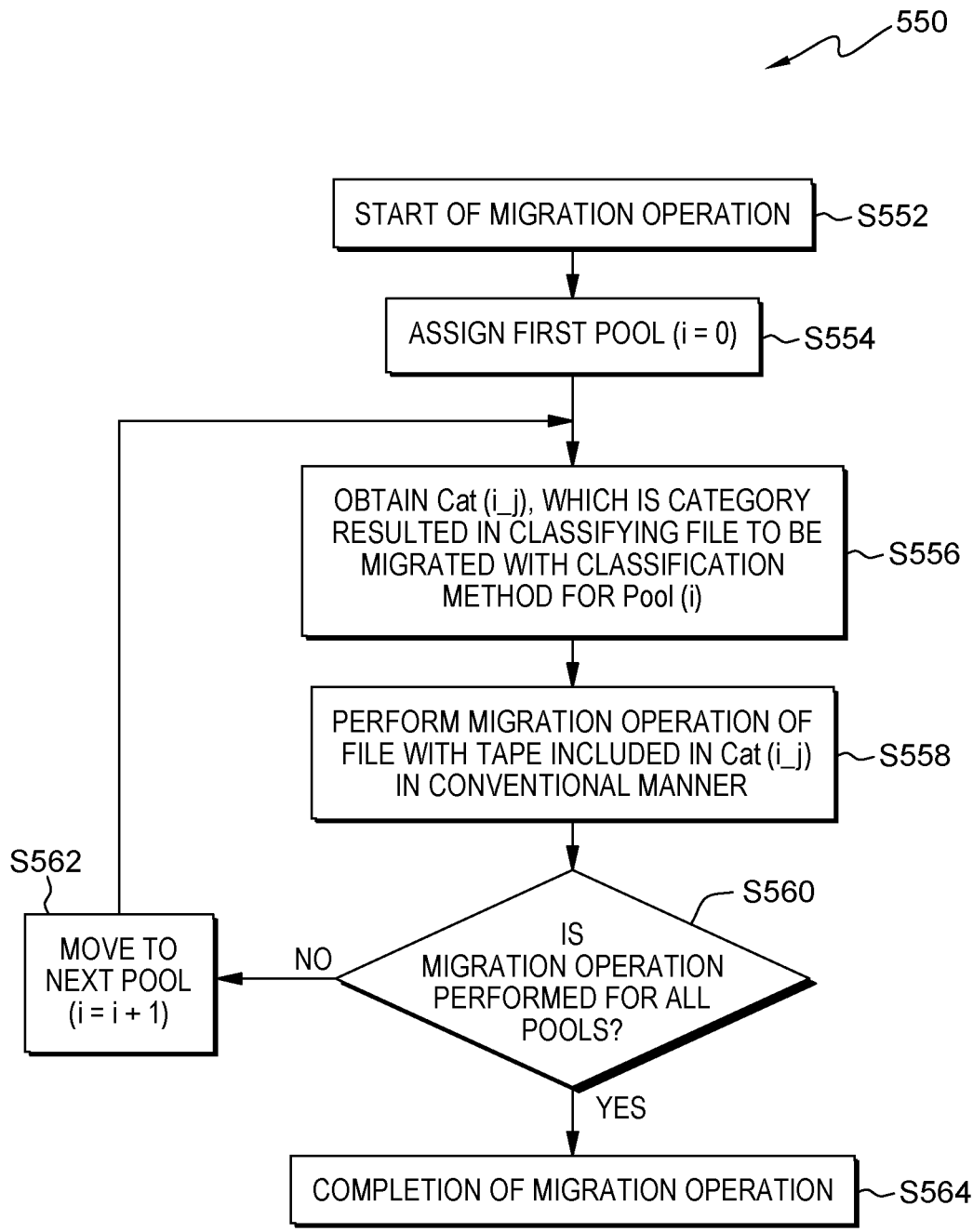
FIG. 5 is a flowchart view of a second embodiment method performed, at least in part, by the second embodiment system.
Figure 6:
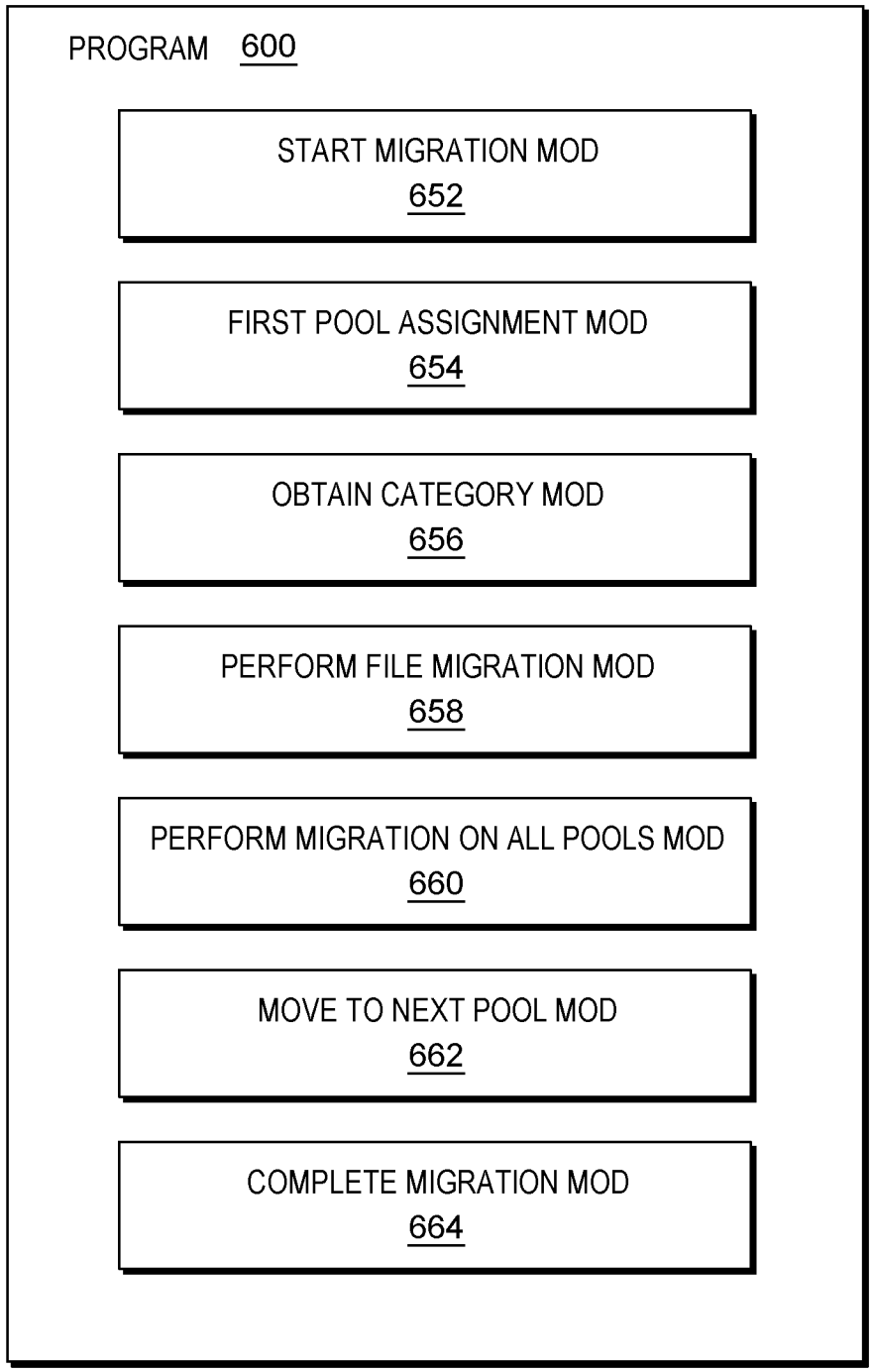
FIG. 6 is a block diagram view of a machine logic portion of the second embodiment of system for performing the second embodiment method according to the present invention.

As shown in FIG. 4, a system for storing a file to a set of storage pools for redundant storage is shown. Operational steps of an exemplary migration process according to an embodiment of the present invention are shown in FIG. 5 for establishing a set of storage pools such that the files are organized according to category of content represented by the file. FIG. 6 shows a diagram of operation blocks for performing the migration process of FIG. 5 according to an embodiment of the present invention. The method of FIG. 5 and associated software of FIG. 6 will now be discussed, over the course of the following paragraphs, with reference also to the FIG. 4 storage system.

Program 600 performs the operational steps of flowchart 550 (FIG. 5) and serves to establish a content-based storage scheme among the storage pools of FIG. 4. An example environment where program 600 may operate is shown in FIG. 1 and may be stored in persistent storage 210 in the same way as storage program 300 is shown.

Processing begins at operation S552, where start migration module ("mod") 652 starts the migration process. In this example, files are grouped into storage tapes assigned content-specific categories in advance. The grouping process applies any one or more of a plurality of classification methods. When selecting a tape for a migration operation, a tape in the category to which the migrating file belongs is selected. Migration as discussed herein operates to organize files for recall according to some embodiments of the present invention.

As an example of files that may be stored according to embodiments of the present invention, in a case in which support operations in a call center are to be recorded, data of recorded conversations is sometimes archived. In this case, texts of the conversations are extracted from audio data and the files of the texts are classified using the following two classification methods: (i) by categories of products, parts and the like are handled; and (ii) by categories of enterprise divisions that are related. Specifically, two classifications are performed to the extracted text data. As shown in FIG. 4, when such classification is to be performed, the tapes in each of the pools are grouped in advance by a dual categorization process where the first category is the product category and the second category is the enterprise division, for example, into categories like the following: (i) category 1-1: (1=products) (1=air conditioner); (ii) category 1-2: (1=products) (2=television); (iii) category 2-1: (2=relevant division) (1=quality control division); (iv) category 2-2: (2=relevant division) (2=product support division); and (v) category 2-3: (2=relevant division) (3=personnel division). (See categorized tape sub-sets of storage pools of FIGS. 4: 458, 460, 462, 464, and 466)

Processing proceeds to operation S554, where first pool assignment mod 654 assigns the first pool (i=0). In this example, a list, or record, is created associating the storage tapes in which various files are stored along with a category for the content within the various files. Tapes are selected and the reading of stored files is performed. Reading continues until there are no unread files. When there are tapes with only one file remaining to be read, those files are read, one by one in order, from the tape from which the file can be read the quickest. Read files are categorized according to the content of the files.

Processing proceeds to operation S556, where obtain category mod 656 obtains cat (i_j), which is a category classifying a file to be migrated with a classification method for pool (i). In this example, when a migration operation is performed with a file containing a content such as "the sound volume of a TV does not increase," classification is performed in the migration operation, and as a result, the file is classified, for example, into category 1-2 (TV) for pool 1 and into category 2-1 (quality control division) for pool 2. Then a tape is selected for each category and the file is migrated to the selected tapes. In general, tapes in a pool are grouped as follows, according to classification categories, and migration is performed. This is also described in more detail below.

Pool(i):={Cat(i_1), Cat(i_2), Cat(i_3), . . . , Cat (i_a)}

Cat(i_k):={Tape(i_k1), . . . , Tape(i_kA)}

Processing proceeds to operation S558 where perform file migration mod 658 performs a migration operation on a file within a tape included in cat (i_j). In this example migration operations are performed per category, and pools are created on a per-category basis (for example, pools are divided on a per-product basis and, to have redundancy for each pool, migration operations are performed in a two-tape archiving manner.

Processing proceeds to decision operation S560 where perform migration on all pools mod 660 determines whether the migration operations are performed for all pools. If the answer to decision operation S560 above is "NO," process-ing follows the "No" branch and proceeds to operation S562, where move to next pool mod 662 advances the pool counter and begins to process the next pool (i=i+1) returning to operation S556. Specifically, in this example, the pool assignment (i) is advanced by one integer and the processing flows back to operation S556 and then again onto operations S558 and S560, as shown in FIG. 5.

If the answer to decision operation S560 above is "YES," processing follows the "Yes" branch, concluding the process at operation S564, where complete migration mod 664 completes the migration operation.

Some embodiments of the present invention recognize the following facts, potential problems and/or potential areas for improvement with respect to the current state of the art: (i) when a large number of tapes need to be read, it takes a long time to change tapes; (ii) changing tapes involves a series of operations including unmounting and unloading a tape inserted into a tape drive, and loading and mounting a tape for reading; and (iii) it normally takes several minutes (about 5 minutes) depending on the type of tape drive and the usage status of the tapes.

A summary of some embodiments of the present invention may include one, or more, of the following operations, features, characteristics and/or advantages: (i) when saving one file to N tapes for redundancy purposes, N pools are prepared in the same way as in a conventional manner, and in addition, a file classification method is prepared for each pool; (ii) tapes included in each pool are, in advance, categorized into groups, the number of which corresponds to the number of the classes of the classification for the pool; (iii) when a migration operation is performed with a file, the file is classified according to the classification method of each pool and then migrated to a tape, whose category matches the classification result; (iv) by performing migration operations in this way, files saved in one tape belong to the same category; and (v) when reading a plurality of files at once, and when the plurality of files belong to the same category, the possibility that they be included in the same tape increases, and the time required for changing tapes is expected to decrease.

Some embodiments of the present invention may include one, or more, of the following operations, features, characteristics and/or advantages: (i) tapes included in pools are grouped into categories in advance using a plurality of classification methods, and (ii) when selecting a tape for a migration operation, a tape in the category to which the file belongs is selected (the number of categories in a pool may be different for different pools, and the number of tapes in a category may be different for different categories).

In the description of FIG. 5 above and Table 1 below, the term "i" refers to pool assignment, the term "j" refers to category assignment, and the term "k" refers to tape assignment.

Some embodiments of the present invention may include one, or more, of the following operations, features, characteristics and/or advantages: (i) in a case in which support operations in a call center are to be recorded, data of recorded conversations is sometimes archived; and (ii) texts of the conversations are extracted from audio data and the files of the texts are classified using the following two classification methods: (a) by categories of products, parts and the like to be handled, and (b) by categories of related divisions.

In one embodiments of the present invention, two classifications are performed to the extracted text data, as shown in Table 1 below.

TABLE 1

Extracted Text Data and assigned categories.

| Text Data | Product Category | Relevant Division |
| --- | --- | --- |
| I have purchased an air conditioner, but its cooling function does not work. | Air Conditioner | Quality Control Division |
| The screen of a TV suddenly went out while in use. | TV | Support Division |

Some embodiments of the present invention may include one, or more, of the following operations, features, characteristics and/or advantages: (i) the extraction of text can be performed using an existing technique (for example, speech to text); (ii) the classification can be performed using an existing technique (for example, a document classification model is created by supervised learning and the text is classified according to that model); and (iii) when such classification is to be performed (for example, as shown in FIG. 4), the tapes in each of the pools are grouped, in advance, into categories like the following: (a) category 1-1: air conditioner, (b) category 1-2: TV, (c) category 2-1: quality control division, (d) category 2-2: support division, and (e) category 2-3: personnel division.

Some embodiments of the present invention may include one, or more, of the following operations, features, characteristics and/or advantages: (i) a description will be given of an example of performing two-tape archiving to tapes of pool 1 and pool 2; (ii) when a migration operation is performed with a file containing a content like "the sound volume of a TV does not increase", classification is performed in the migration operation, and as a result, the file is classified into category 1-2 (TV) for pool 1 and into category 2-1 (quality control division) for pool 2, then a tape is selected for each category and the file is migrated to the selected tapes; (iii) in general, tapes in a pool are grouped, as follows, according to classification categories as shown in Table 2 below; and (iv) tapes are grouped into categories in this way and a migration operation is performed in a flow (for example, as shown in FIG. 5).

TABLE 2

Classification Categories Flow for Pools and Tape Assignments.

Pool(i) := {Cat(i_1), Cat(i_2), Cat(i_3), ... ,Cat(i_a)}
Cat(i_k) := {Tape(i_k1) , ... , Tape(i_kA)}

Some embodiments of the present invention may include one, or more, of the following operations, features, characteristics and/or advantages: (i) by classifying a file when the file is to be migrated and grouping tapes in pools into categories according to the classification in advance, files belonging to the same category can be saved on the same tape; (ii) when the files are read, multiple files are expected to be read in a manner like a selective recall operation; (iii) tape selection in a selective recall operation is carried out in such a manner that the number of tapes mounted is decreased; and (iv) specifically, assuming that L is a list of files to be read, reading the files according to the flowchart (as shown in FIG. 5) decreases the number of mounting.

A method according to an embodiment of the present invention includes a process whereby a migration operation is performed with selecting a tape according to the classification performed in advance (for example, as shown in FIG. 5) so that when reading a plurality of files from a tape drive, the possibility that multiple files have been saved in the same tape is increased.

In one embodiment of the present invention, consider a case in which the classification represented in Table 1 has been performed. This embodiment includes but is not limited to: (i) when "causes of TV sales being low this year are to be investigated", it is conceivable to create a list of files whose product category has been determined as "TV" and read the files on that list, in which case it is highly likely that such files have been saved on the same tape; and (ii) when "problems of the support division in the last year are to be reviewed", it is conceivable to create a list of files categorized into the support division and read the files on that list, in which case it is highly likely that such files have been saved on the same tape.

Some embodiments of the present invention may include one, or more, of the following operations, features, characteristics and/or advantages: (i) even in conventional techniques, migration operations are performed per category and pools are created on a per-category basis (for example, pools are divided on a per-product basis and, to have redundancy for each pool, migration operations are performed in a two-tape archiving manner); (ii) specifically, four pools of pool A (TV), pool B (air conditioner), pool C (TV) and pool D (air conditioner) are created, and files relevant to TV are migrated to a tape in pool A (TV) and to a tape in pool C (TV); (iii) when files have been migrated in such a manner, reading files relevant to the support division entails reading files present in pool A or pool C and reading files present in pool B or pool D, thus an increase in the number of operations of mounting a tape is anticipated because the tapes are different; and (iv) according to the conventional method, files are not classified when they are migrated and thus a user classifies the files in advance and determines which files are to be migrated to which pools.

Some embodiments of the present invention may include one, or more, of the following operations, features, characteristics and/or advantages: (i) category classifications for pool 1 and pool 2 are different; (ii) the number of mount operations can be decreased even when files belonging to any category are read; (iii) when a migration operation for a file is performed, the content of the file is checked for classification; (iv) the user does not need to classify the file by himself or herself and can perform the migration operation while solely considering the redundancy of saving; (v) has been described with an example of writing a file to two tapes; and (vi) when writing many tapes for greater redundancy, it is expected that increasing the number of classification methods makes it possible to decrease the number of mount operations for reading.

As an example, one embodiment of the present invention: (i) considers a case in which 100 files have been written into 100 tapes in the conventional manner and a case in which the same 100 files can be read from 10 tapes using the present invention; (ii) assumes that changing a tape takes about 5 minutes (though depending on the type of the tape and the position where the data have been written), the time for changing tapes for reading the 100 files in the former case is 500 minutes=5 minutes×100, which can be reduced to 50 minutes=5 minutes×10 in the latter case; and (iii) the time for reading is reduced by approximately one-tenth.

Some embodiments of the present invention may include one, or more, of the following operations, features, characteristics and/or advantages: (i) classifications are performed using text data, however, any other classification method can be used; (ii) when archiving image data obtained from meteorological satellites, the image data can be classified by two classifications: (a) by region categories, and (b) by weather condition (clear, rainy, snowy, typhoon, etc.) using image classification and then saved on tapes; (iii) when retrieving "meteorological data of a large city in the last year", a tape classified according to region categories is read; and (iv) when retrieving "data of a past storm", a tape classified according to weather condition categories, is read.

Some embodiments of the present invention may include one, or more, of the following operations, features, characteristics and/or advantages: (i) there may be a case in which files classified in terms of a viewpoint, different from the pre-classified categories, are desired to be read; (ii) when reading files belonging to a category, it is possible that a large number of files may have been written in the same category and a plurality of tapes may be assigned to the category; (iii) files distributed over the plurality of tapes need to be read; and (iv) as the conventional method does not perform categorization or divide pools per category (that is, assign each pool to one category), reading of the files is never slower than conventional methods.

According to an embodiment of the present invention, a method of archiving files with a tape drive in a redundant manner wherein one file is to be saved to N tapes for redundancy purposes, includes the following operations (not necessarily in the following order): (i) prepares N pools, each possibly containing a plurality of tapes; (ii) prepares a classification method of files for each of the N pools; (iii) groups the plurality of tapes contained in each of the N pools into a plurality of categories according to the classification method; and (iv) migrates a file to each of the N pools, wherein the migrating comprises migrating the file to a tape of a category to which the file belongs.

Some embodiments of the present invention may include one, or more, of the following operations, features, characteristics and/or advantages: (i) performs classification of files in a pool; (ii) performs changing tapes by classification; and (iii) does not take a long time to change tapes when multiple files are recalled.

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
defining a plurality of content categories, where each content category corresponds to a different type of subject matter;
assigning a tape storage medium to each content category of the plurality of content categories;
receiving a plurality of digital files; and
for each given digital file of the plurality of digital files:
analyzing contents of a presentation included in the given file,
assigning at least a first applicable content category to the given digital file based on the contents of the given digital file, and
storing the given digital file on the tape medium that is assigned to the first applicable content category that has been determined for the given digital file.

2. The computer-implemented method of claim 1, wherein:
each digital file of the plurality of digital files includes a text based presentation; and
the analysis of contents of each digital file is a textual analysis of the text of the text-based presentation included in each digital file.

3. The computer-implemented method of claim 1 wherein:
each digital file of the plurality of digital files includes an audio presentation; and
the analysis of contents of each digital file includes:
transcribing the audio presentation and each digital file of the plurality of digital files performing a textual analysis of the text of the transcription respectively corresponding to each digital file.

4. A computer program product comprising:
a set of storage device(s); and
computer code stored collectively in the set of storage device(s), with the computer code including data and instructions to cause a processor(s) set to perform at least the following operations:
defining a plurality of content categories, where each content category corresponds to a different type of subject matter,
assigning a tape storage medium to each content category of the plurality of content categories,
receiving a plurality of digital files, and
for each given digital file of the plurality of digital files:
analyzing contents of a presentation included in the given file,
assigning at least a first applicable content category to the given digital file based on the contents of the given digital file, and
storing the given digital file on the tape medium that is assigned to the first applicable content category that has been determined for the given digital file.

5. The computer program product of claim 4, wherein:
each digital file of the plurality of digital files includes a text based presentation; and the analysis of contents of each digital file is a textual analysis of the text of the text-based presentation included in each digital file.

6. The computer program product of claim 4 wherein:

each digital file of the plurality of digital files includes an audio presentation; and the analysis of contents of each digital file includes: transcribing the audio presentation and each digital file of the plurality of digital files performing a textual analysis of the text of the transcription respectively corresponding to each digital file.

7. A computer system comprising:

a processor(s) set;

a set of storage device(s); and computer code stored collectively in the set of storage device(s), with the computer code including data and instructions to cause the processor(s) set to perform at least the following operations:

defining a plurality of content categories, where each content category corresponds to a different type of subject matter, assigning a tape storage medium to each content category of the plurality of content categories, receiving a plurality of digital files, and for each given digital file of the plurality of digital files:

analyzing contents of a presentation included in the given file, assigning at least a first applicable content category to the given digital file based on the contents of the given digital file, and storing the given digital file on the tape medium that is assigned to the first applicable content category that has been determined for the given digital file.

8. The computer system of claim 7, wherein:

each digital file of the plurality of digital files includes a text based presentation; and the analysis of contents of each digital file is a textual analysis of the text of the text-based presentation included in each digital file.

9. The computer system of claim 7 wherein:

each digital file of the plurality of digital files includes an audio presentation; and the analysis of contents of each digital file includes: transcribing the audio presentation and each digital file of the plurality of digital files performing a textual analysis of the text of the transcription respectively corresponding to each digital file.

\* \* \* \* \*